(12) United States Patent
Vittal

(10) Patent No.: US 6,810,496 B1
(45) Date of Patent: Oct. 26, 2004

(54) SYSTEM AND METHOD FOR TROUBLESHOOTING A NETWORK

(75) Inventor: Chiradeep Vittal, Santa Clara, CA (US)

(73) Assignee: CIENA Corporation, Linthicum, MD (US)

( * ) Notice: Subject to any disclaimer, the term of this patent is extended or adjusted under 35 U.S.C. 154(b) by 523 days.

(21) Appl. No.: 10/005,716

(22) Filed: Nov. 7, 2001

(51) Int. Cl.[7] .............................................. G06F 11/00
(52) U.S. Cl. ........................... 714/57; 714/31; 714/46; 709/224
(58) Field of Search ................................ 714/4, 31, 46, 714/48, 57; 709/224; 379/9.03

(56) References Cited

U.S. PATENT DOCUMENTS

| | | | | |
|---|---|---|---|---|
| 5,748,880 A | * | 5/1998 | Ito et al. ........................ | 714/46 |
| 5,768,501 A | * | 6/1998 | Lewis ........................... | 714/48 |
| 6,601,185 B1 | * | 7/2003 | Bass et al. ...................... | 714/4 |
| 6,631,409 B1 | * | 10/2003 | Watson et al. ............... | 709/224 |
| 6,694,455 B1 | * | 2/2004 | Scrandis et al. .............. | 714/31 |

* cited by examiner

Primary Examiner—Robert Beausoliel
Assistant Examiner—Gabriel Chu
(74) Attorney, Agent, or Firm—Michael R. Cammarata; Shailendra Bhumralkar

(57) ABSTRACT

The present invention provides a system and method for effective troubleshooting of a network. In one embodiment, the present invention provides a system for troubleshooting a network having a plurality of network elements. A management station may be coupled to one of the network elements for signaling a distributed network operating system to transmit alarm information from each network element to the management station for display to a user. The system also includes a plurality of network element subsystems in each network element, wherein at least one of the plurality of network element subsystems generates a subsystem alarm in response to a subsystem fault condition. The distributed network operating system includes a plurality of subsystem applications on each network element, wherein at least one of the subsystem applications on each network element generates an application alarm in response to receiving the subsystem alarm.

28 Claims, 12 Drawing Sheets

SYSTEM AND METHOD FOR TROUBLESHOOTING A NETWORK

BACKGROUND

The present invention relates to networks, and more particularly, to a system and method for troubleshooting a network.

Recent years have seen an explosion in the demand for a variety of network applications and services. For example, as more and more users connect their personal computer systems to the internet, there is an ever increasing demand placed on the various networks that are used to support the evolving functionality of the internet. For another example, there is also an ever increasing demand placed on networks used in the telecommunications industry as the industry expands functionality to include carrying both voice and data across telecommunications networks.

Generally, networks typically comprise a number of data processing elements connected together in a variety of configurations to allow communication of information between the elements of the network and across different network groups. The data processing elements in a network may include client computer systems, server computer systems, routers, bridges, telecommunication equipment, or optical communication equipment to name just a few. Furthermore, advanced data processing elements may further comprise both hardware and software subsystems such as, for example, power supply subsystems and hardware and/or software data communication subsystems. The data processing elements, which may also be referred to as network elements, may be connected together in a network in a variety of configurations to receive, transmit, and/or process various types of information, such as voice information, video information, or generalized data, for example.

To meet the ever increasing demands for performance and functionality, network architectures, networks elements, and network element subsystems have grown in complexity. However, as the complexity of networks has increased, the complexity and burden of managing, troubleshooting, and correcting software and hardware faults across the network has also increased. For example, when a subsystem in a network element fails (hardware or software), the impact on the network not be immediately evident, but the failure may eventually lead to a critical error under certain later encountered network conditions. Such errors may include the loss of data, a complete network failure, or even possible damage to the equipment. On the other hand, some faults may be less critical, and may only result in the loss of certain functionality or a reduction in performance of the network.

Furthermore, as the complexity of the systems has increased, the quantity and nature of the potential faults has also increased to a level that can be unmanageable. In modern network systems, the number of potential faults that can occur in a system can make it extremely difficult to determine critical faults from noncritical faults. Moreover, increased complexity also makes fault correction (i.e., maintenance and/or repair) extremely burdensome. For example, in an optical network, each of the network elements may be hundreds of kilometers apart. Thus, the inability to quickly and accurately identify and diagnose a network fault can force maintenance technicians or engineers to make potentially many repeated trips across large distances in order to address and eliminate the fault, thereby leading to financial detriments from costly network downtime or increased maintenance expenses, or both.

Thus, it is important for network administrators to be able to quickly diagnose problems in the network as they arise. Accordingly, what is needed is an improved system and method for troubleshooting a network.

SUMMARY

Embodiments of the present invention provide an improved system and method for troubleshooting a network. In one embodiment, a system for troubleshooting a network comprises a plurality of network elements coupled together to communicate information across the network, a management station coupled to a first network element in the plurality of network elements, a plurality of network element subsystems in each network element, at least one of the plurality of network element subsystems in each network element generating a subsystem alarm in response to a subsystem fault condition, and a distributed network operating system including a plurality of subsystem applications on each network element, at least one of the subsystem applications on each network element, executable on a corresponding subsystem, generating an application alarm in response to receiving the subsystem alarm. The management station signals the distributed network operating system to transmit application alarms and subsystem alarms from each network element, across the network to the first network element, and to the management station for display to a user.

In another embodiment, a method of troubleshooting a plurality of network elements in a network under control of a distributed network operating system is provided. Each network element includes a plurality of network element subsystems. The method comprises generating a subsystem alarm for at least one of the plurality of network element subsystems in response to a corresponding subsystem fault, generating an application alarm in a subsystem application, executable on a corresponding network element subsystem, in response to the subsystem alarm, associating text with the application alarm, the associated text describing the subsystem fault, and transmitting the subsystem alarm, the application alarm, and the associated text across the network to a management station coupled to one of the network elements for display to a user.

The following detailed description and accompanying drawings provide a better understanding of the nature and advantages of the present invention.

DETAILED DESCRIPTION

Embodiments of the present invention provide an improved apparatus and method of troubleshooting a network. As stated above, modern networks include complex networking equipment that may include a number of network elements each made up of a variety of subsystems. The present invention includes a system for troubleshooting such a complex network. A network typically includes a number individual network elements coupled together to communicate information. A management station is coupled to at least one of network elements for allowing a user to monitor and control various network functionality. Each network element includes a number of network element subsystems for implementing the functionality of the network element. The network element subsystems are designed to generate subsystem alarms in response to subsystem fault conditions. A distributed network operating system is provided for controlling the operability of the network. Each network element includes network operating system ("NOS") software loaded onto each node in the network. Together, the NOS software on each node makes up the distributed network operating system. Each subsystem may include one or more subsystem applications that are part of the NOS, but are executed on a particular network element subsystem. A subsystem application can receive the subsystem alarm, either from the local subsystem or from another external subsystem, and in response, generates an application alarm indicating the that subsystem fault condition has rendered the subsystem application inoperable. The NOS may also associate text with the application alarm that describes or indicates the subsystem fault condition that triggered the application alarm.

According to embodiments of the present invention, alarms and text can be compiled in the management station to allow a user to troubleshoot the faults in the network. For example, a user may connect a management station to one of the network elements in the network. The management station may then signal the distributed network operating system to transmit all active application alarms and subsystem alarms from each network element, across the network, and to the management station for display to a user. A user can then examine the application alarms, subsystem alarms, and associated text to deduce the root cause of network faults, and take corrective measures.

Figure 1:
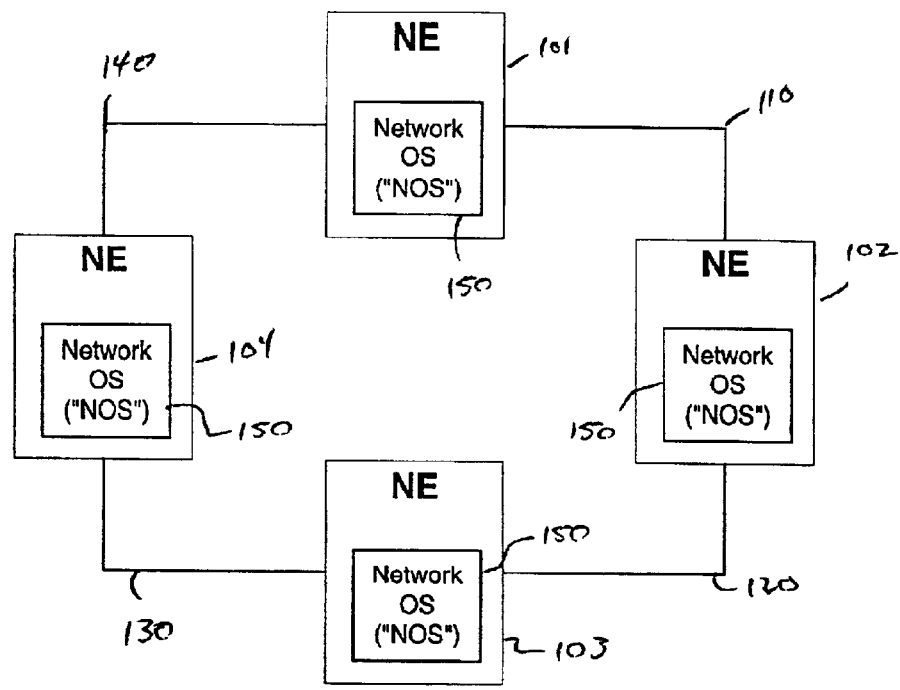
FIG. 1 illustrates a ring network including a distributed network operating system according to one embodiment of the present invention.

FIG. 1 illustrates one exemplary network configuration that may utilize embodiments of the present invention. The network configuration shown in FIG. 1 is a ring network configuration, which includes a distributed network operating system 150 according to one embodiment of the present invention. The ring network configuration of FIG. 1 includes network elements 101–104 connected together in a ring by communication media 110–140 for transferring data between adjacent network elements. Network operations may be controlled by the distributed network operating system. Each network element 101–104 includes distributed network operating system ("NOS") software 150 for controlling network operations on the node, and for controlling the interoperability of each network element with other network elements.

Figure 2:
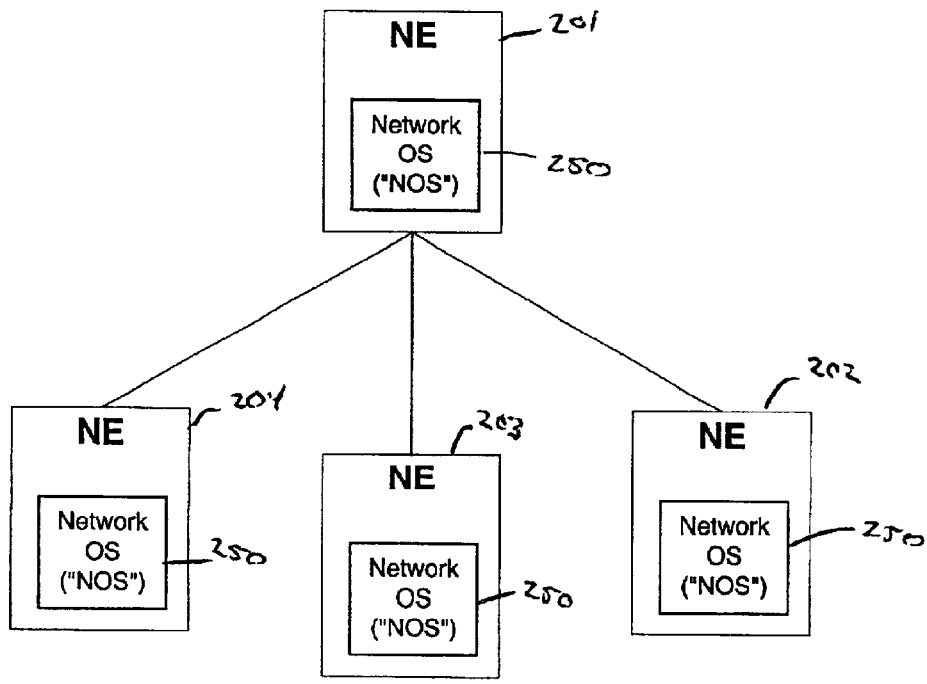
FIG. 2 illustrates a star network configuration controlled by a distributed network operating system according to another embodiment of the present invention.
Figure 3:
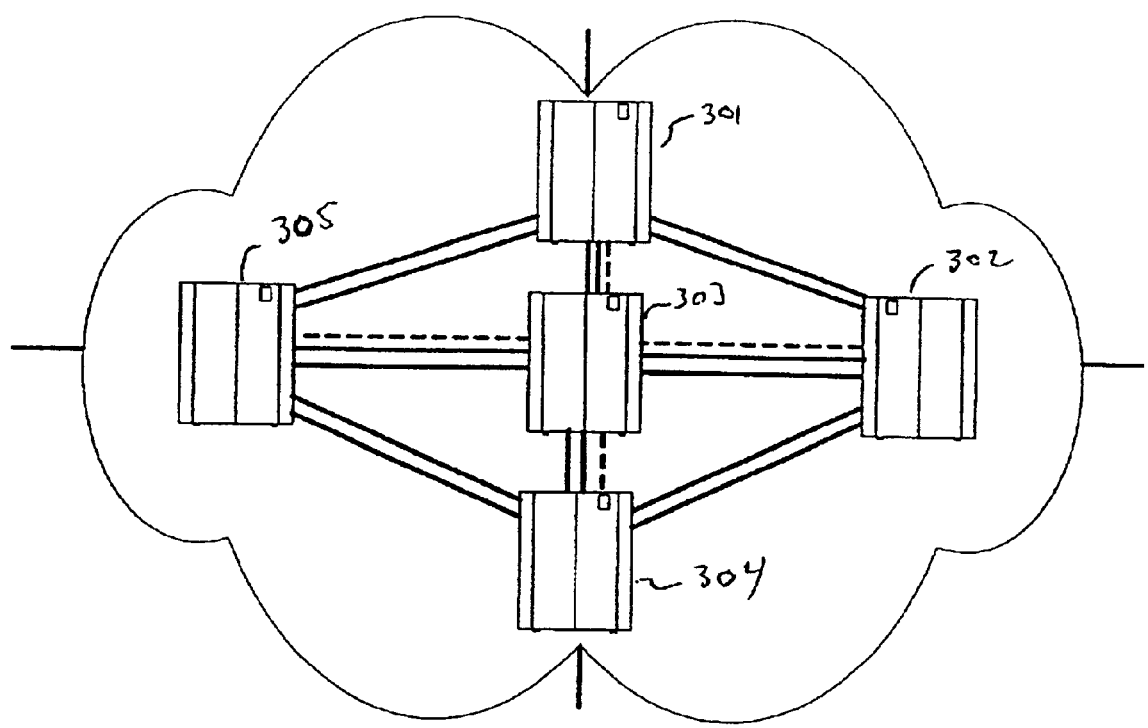
FIG. 3 illustrates a mesh network configuration controlled by a distributed network operating system according to another embodiment of the present invention.

FIGS. 2 and 3 illustrate two alternative network configurations according to other embodiments of the present invention. FIG. 2 illustrates a star network configuration controlled by a distributed network operating system 250 loaded on network elements 201–204. In a star configuration, a central network element 201 is connected to each of the network element nodes 202–204. Data is first passed to the central network element 201, which handles further routing either between nodes or external to the network. FIG. 3 illustrates a mesh network configuration controlled by a distributed network operating system loaded on network elements 301–305 according to another embodiment of the present invention. In a mesh configuration, each network element has two or more paths to any of the other network elements. It will be understood that a mesh configuration may also be implemented by joining two or more adjacent ring networks.

Figure 4:
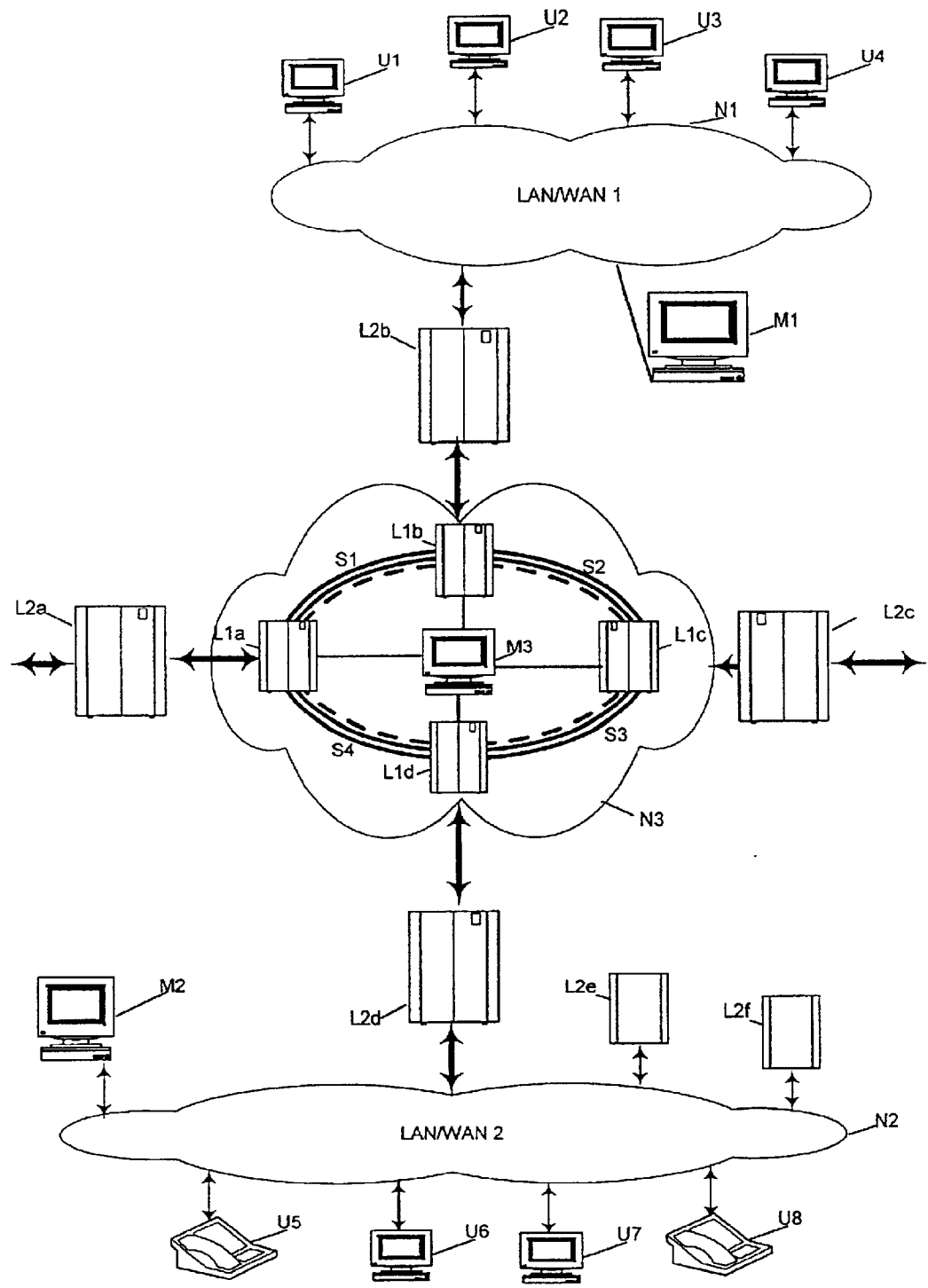
FIG. 4 illustrates an internetworking structure that may be utilized in embodiments of the present invention.

FIG. 4 illustrates an internetworking structure that may be utilized in embodiments of the present invention. FIG. 4 can be read as comprising three networks, N1, N2, and N3. Network N1 connects end systems U1–4, management station M1, and network element L2b. Network N2 connects end systems U5–8, management station M2, and network elements L2d–f. Network N3 is comprised of network elements L1a–d and provides connections between L2a–d and those devices connecting N1 and N2. Each network N1, N2, and N3 may also include a distributed network operating system for controlling the operation of the networks, and for controlling communication between the networks. In one embodiment, N1 and N2 are local user networks, and N3 is a subnetwork for providing communication between local user networks. L2 network elements may therein represent routers or other network elements for connecting local networks to a wider network. Each of the network clouds labeled N1 and N2 could be understood as configurations of ethernet equipment, fiber optic equipment, radio frequency mesh network equipment, LAN ATM equipment, or combinations of technologies now existing or later developed to provide network communication. In another embodiment, N3 represents a subnetwork, and the L1 network elements are subnetwork network elements. Subnetwork technologies may include ATM, TDM, optical transmission technologies such as SONET, for example. One optical configuration is represented by the ring configuration shown in FIG. 1 and another configuration is represented by the mesh configuration shown in FIG. 3.

Figure 5:
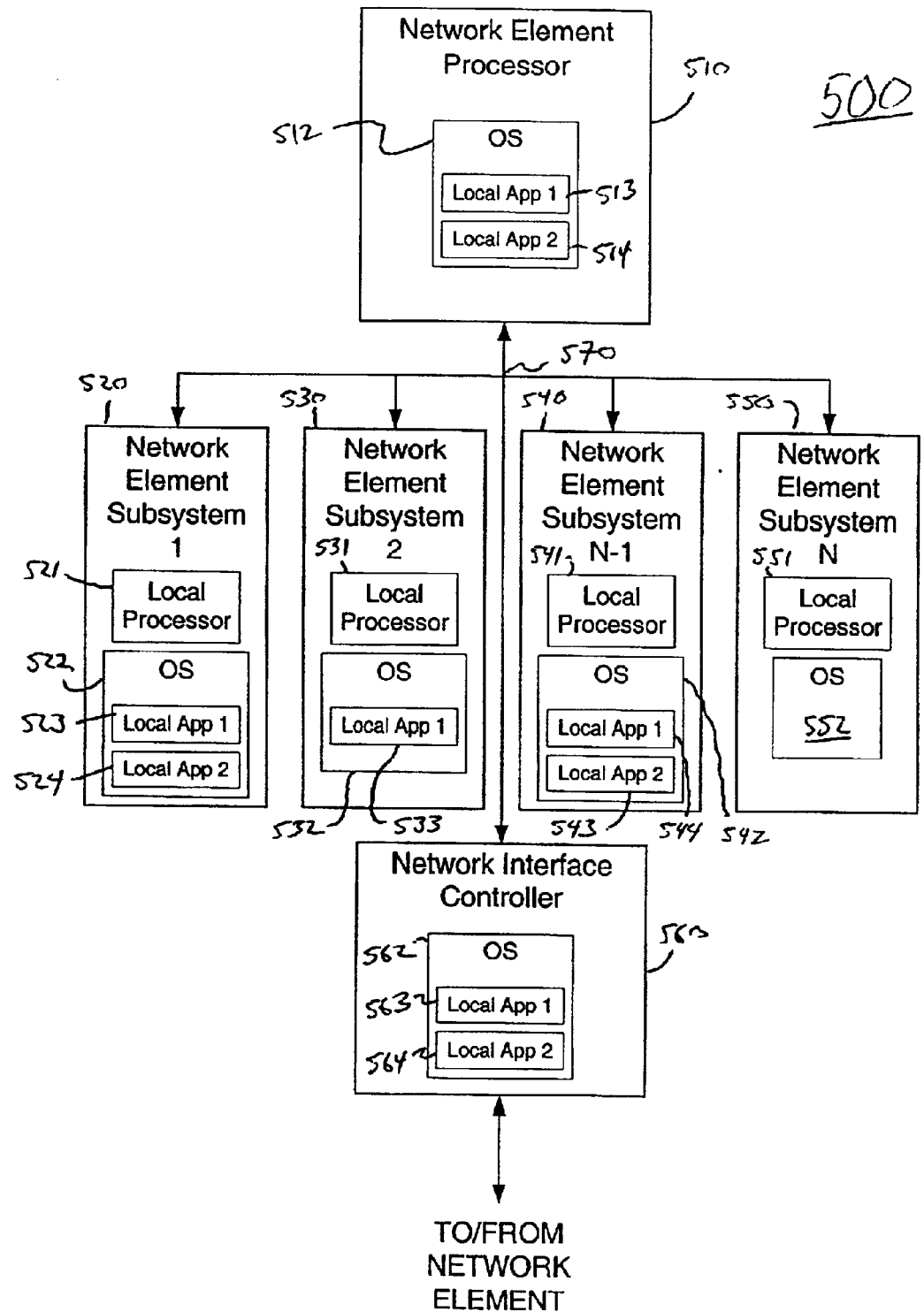
FIG. 5 illustrates a diagram of a network element that may be utilized in embodiments of the present invention.

FIG. 5 illustrates a diagram of a network element that may be utilized in embodiments of the present invention. A network element 500 may include a network element processor 510 for executing the primary operations and control of the network element, a number of subsystems (e.g., N subsystems) 520–550 for executing functions particular to each subsystem, a network interface controller 560 for controlling the reception and transmission of signals to and from the network element 500, and an communication media 570, such as an ethernet or bus, for allowing communication between network element 500, subsystems 520–550, and network interface controller 560. One skilled in the art will recognize that a variety of subsystems may be required in various network elements. The specific subsystem will depend on the architecture of the particular network element. Each subsystem 520–550 also includes a local processor 521–551, respectively.

The distributed network operating system may include NOS software executable on the network element processor 510, network interface controller 560, and on the subsystem local processors 521–551. The NOS software 512 on network element processor 510 may include local applications 513 and 514, and the NOS software 562 on network interface controller 560 may include local applications 563 and 564. One skilled in the art will recognize that a variety of local applications may be included as part of the NOS software executable on the network element processor 510 and network interface controller 560, depending on the architecture of the system.

The NOS software executable on each subsystem local processor may also include one or more local applications for executing subsystem specific operations. For example, NOS 522 executed on local processor 521 in network element subsystem 520 may include local applications 523 and 524. Alternatively, NOS 532 executed on the local processor 531 in network element subsystem 530 may include only one local application 533. Some subsystem NOS software may not include any local applications, such as NOS 552 on subsystem 550.

Figure 6:
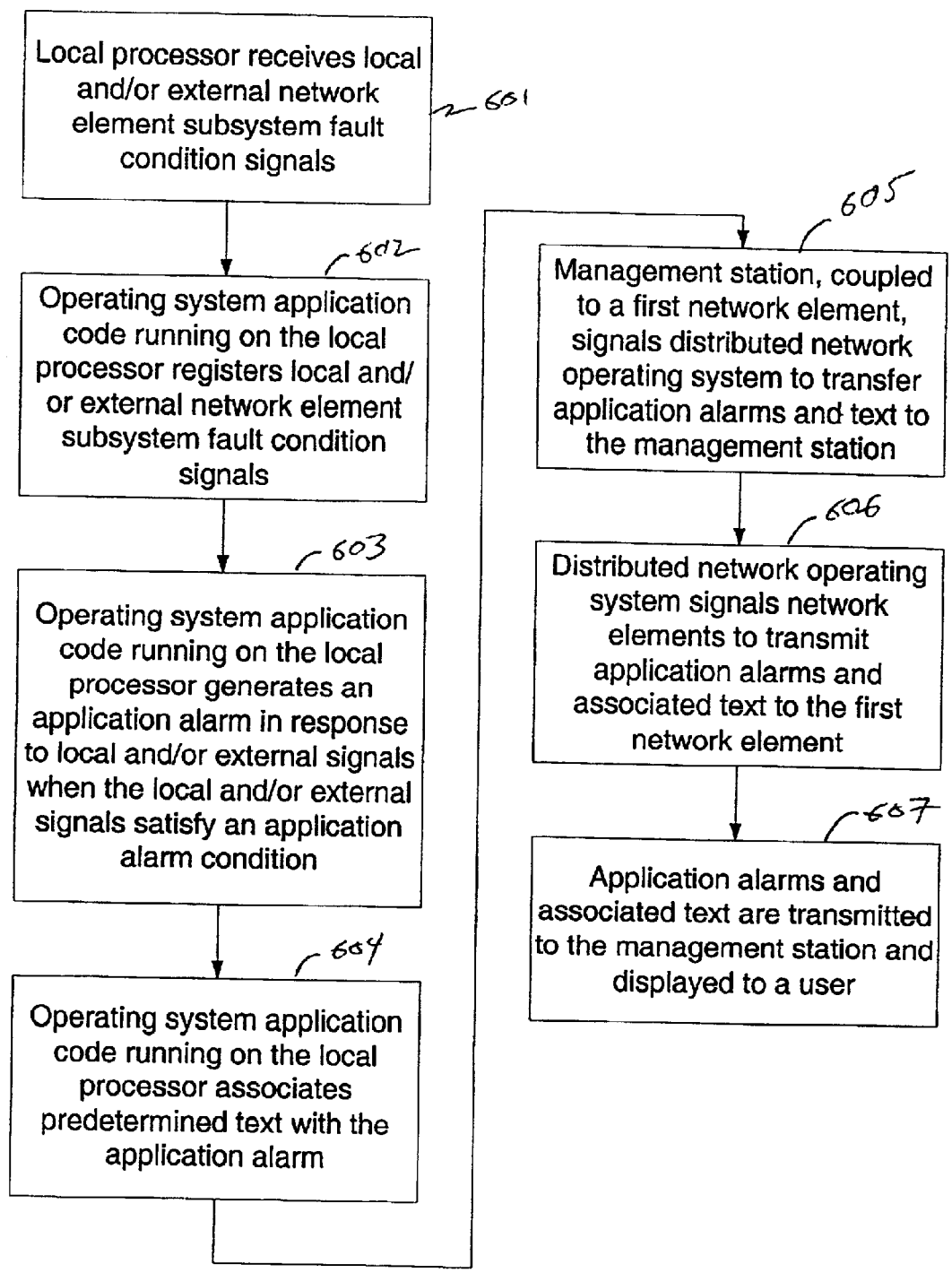
FIG. 6 illustrates a method of troubleshooting a network according to one embodiment of the present invention.

Complex networks, such as those described above and others, may benefit from features and advantages of the present invention because of the reduced burden of troubleshooting the various subsystems and applications that are included in the network elements. FIG. 6 illustrates a method of troubleshooting a network according to one embodiment of the present invention. At step 601, a local processor in a network element subsystem receives local and/or external network element subsystem fault condition signals indicating either that local subsystem, or one of the external subsystems, has experienced a fault condition. For example, if subsystem 520 of FIG. 5 experienced a fault, the local subsystem processor 521 may receive a local signal indicative of the fault. Alternatively, if subsystem 550 experienced a fault, processor 521 on subsystem 520 may receive external fault condition signals over communication media 570 indicating the fault in subsystem 550. The local and/or external fault condition signals may include subsystem alarms generated by a subsystem in response to a fault condition. The fault condition signals or subsystem alarms may also be used to indicate the probable cause of a failure to a user, as is described in more detail below.

At step 602, an NOS application running on the local processor registers the local and/or external subsystem fault condition signals. For example, if subsystem 520 receives local or external fault condition signals in local processor 521, then one of the applications running on the subsystem processor (e.g., applications 523 or 524) may register or otherwise receive notification of the fault. At step 603, the subsystem application generates an application alarm in response to local and/or external fault condition signals when the local and/or external fault condition signals satisfy an application alarm condition defined in the application software. For example, if proper operation of an application requires that other subsystems are operating properly (i.e., the application has a particular subsystem dependency), then a particular subsystem fault condition may cause the application to be inoperable. Thus, the application software may define one or more application alarm conditions in accordance with subsystem dependencies. Application 523 may, for example, require that both local subsystem 520 and external subsystem 550 be completely operable in order to carry out its functionality. Thus, application 523 may include software for generating an application alarm when an alarm condition is satisfied, i.e., when a fault condition from either subsystem 520 or 550 has been received.

At step 604, the NOS application generating the application alarm may optionally associate predetermined text with the application alarm. In one embodiment, the NOS application will associate text with the application alarm that corresponds to the particular fault condition signal that triggered the application alarm. The associated text may describe the particular fault that triggered the application alarm, for example. At step 605, a management station, coupled to one of the network elements, signals the distributed network operating system to transfer the application alarms and associated text to the management station. At step 606, the distributed network operating system signals the network elements to transmit the application alarms and associated text to the network element that the management station is connected to. At step 607, all active application alarms and associated text are transmitted from each network element to the management station. Software on the management station is used to compile and display the application alarms and associated text to a user.

Figure 7:
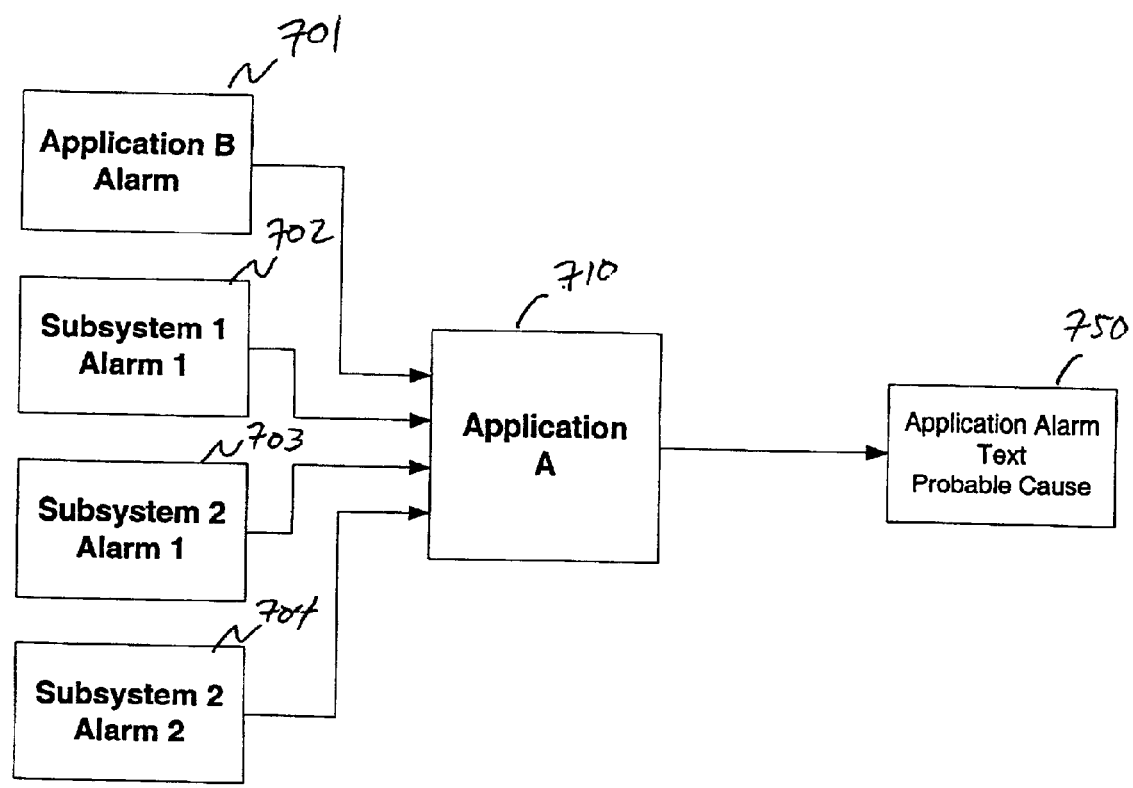
FIG. 7 shows a diagram illustrating how application alarms may be generated according to one embodiment of the present invention.

FIG. 7 shows a diagram illustrating how application alarms may be generated. Application 710 (i.e., application A) may be part of the network operating system executable on subsystem 1, for example. Proper functionality of application A may require the proper operation of a function of subsystem 1, two functions in subsystem 2, and proper functionality of another NOS application program, application B. The dependency of application A on application B and functions in subsystems 1 and 2 is illustrated in FIG. 7. If application B generates an application B alarm 701 indicating inoperability, then application A's application alarm condition is satisfied, and application A will generate an application alarm to indicate its own inoperability. Furthermore, if subsystem 1 generates subsystem alarm 1, at 702 (i.e., fault condition signals in subsystem 1 indicating inoperability of part of subsystem 1), in response to a failure of the function upon which application A depends for proper operation, then application A's application alarm condition is again satisfied, and application A will generate an application A alarm. Similarly, if either subsystem alarms 1 or 2 from subsystem 2 are activated, at 703 or 704, respectively, then application A will generate an application alarm.

Additional text corresponding to the cause of the application alarm may also be associated with the application alarm. For example, if the application alarm is generated in response to subsystem 1 alarm 1, then the text associated with the application alarm may describe the fault condition that caused subsystem 1 alarm 1. Furthermore, additional information about the probable cause of a subsystem alarm may also be included in the alarm information. The application alarm, associated text, and probable cause may then be transmitted to a management station for troubleshooting the network, as illustrated at 750.

Figure 8:
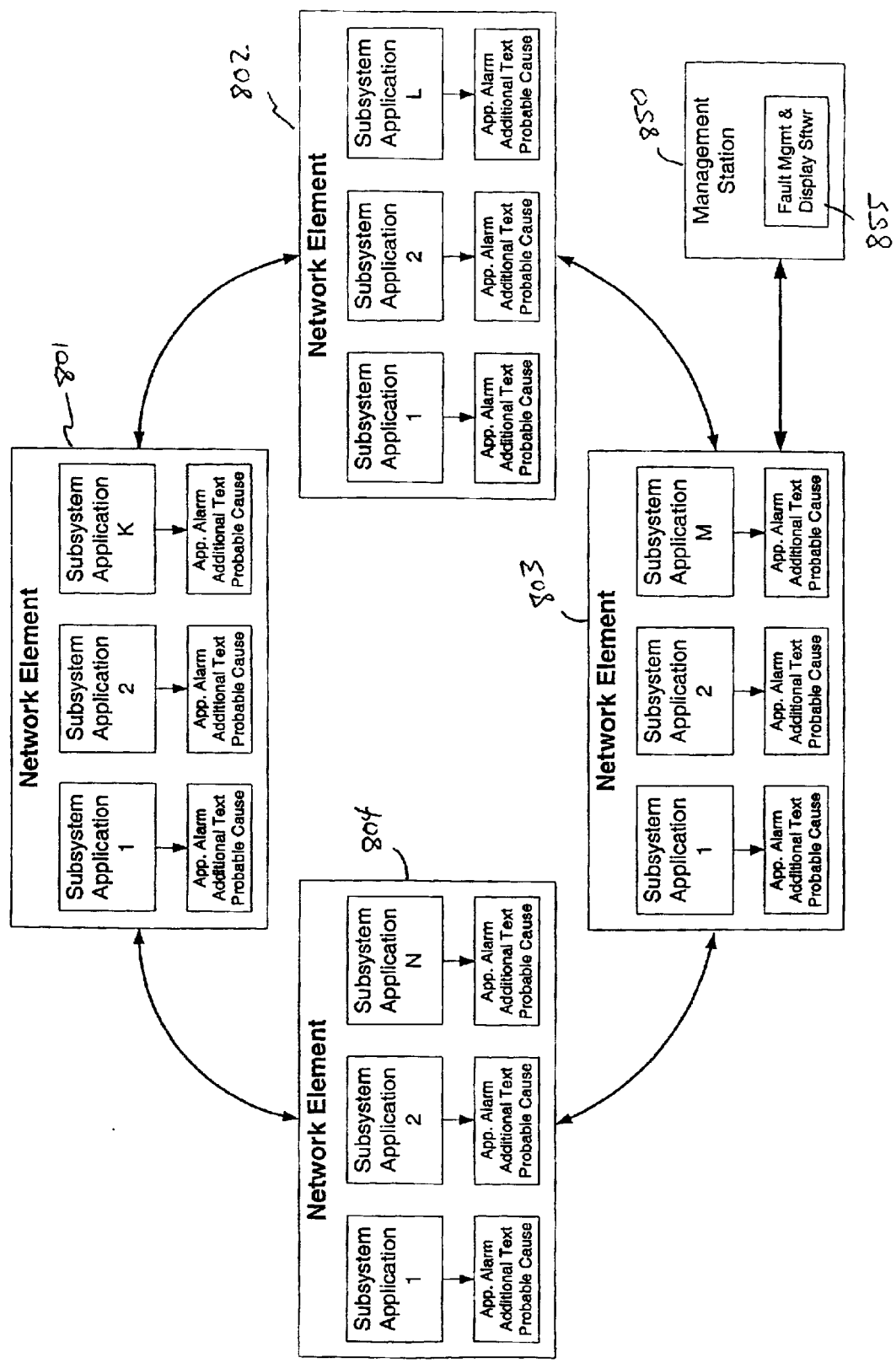
FIG. 8 illustrates network elements configured in a ring network and coupled to a management station according to one embodiment of the present invention.

FIG. 8 illustrates network elements 801–804 configured in a ring network and coupled to a management station 850 according to one embodiment of the present invention. The management station 850 includes fault management and display software 855 for transmitting signals to the distributed network operating system on the ring network. The distributed network operating system, with NOS components in each network element, responds by transmitting alarm information such as application alarms, text, and probable causes back to the management station. The fault management and display software 855 receives the alarm information and displays the information to a user. This information allows the user to identify individual network elements experiencing fault conditions, and importantly, the subsystems causing the problems and the applications affected by the problems. Thus, features and advantages of the present invention allow a user to connect a management station to any network element in a network, and download all fault information for display on a single terminal. Accordingly, the user may quickly and accurately take corrective action to restore the operability of the network.

Figure 9:
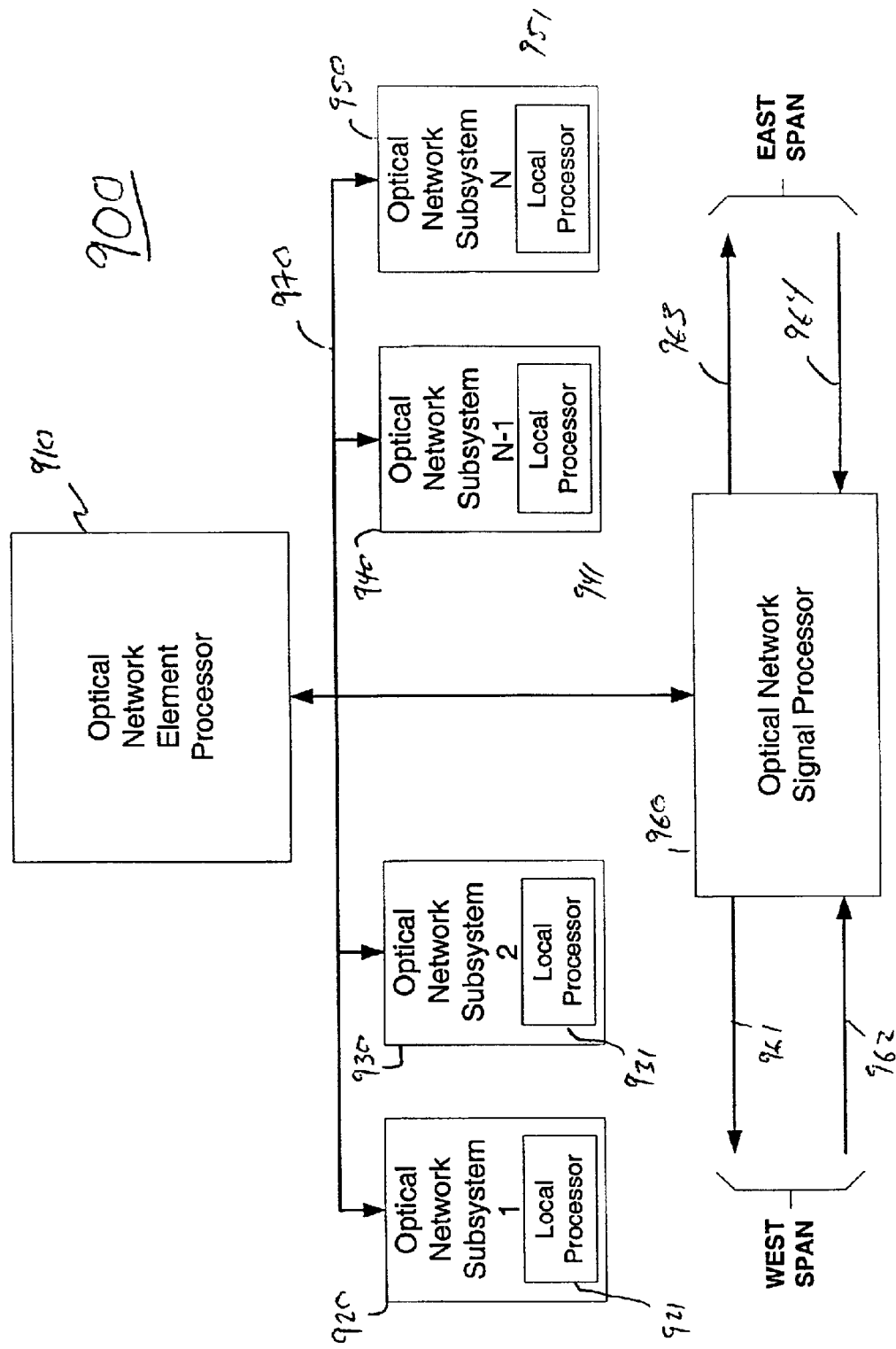
FIG. 9 shows an optical network element used in an optical network according to one embodiment of the present invention.

Embodiments of the present invention are particularly advantageous in optical networking applications. FIG. 9 shows an optical network element 900 used in an optical network according to one embodiment of the present invention. The optical network element 900 includes an optical network element processor 910, optical network signal processor 960, and optical network subsystems 920–950. Each subsystem may perform a variety of subsystem functions, which may vary depending on the architecture of the system. Each subsystem may include a local processor, such as local processors 921–951 in subsystems 920–950, respectively, for executing network operating system software and associated application software loaded onto each subsystem. Optical network signal processor 960 receives optical signals on east bound fiber 962, and transmits optical signals on west bound fiber 961. Fibers 961 and 962 make up the west span. Optical network signal processor 960 also receives optical signals on west bound fiber 964, and transmits optical signals on east bound fiber 963. Fibers 963 and 964 make up the east span. Optical network element processor 910, optical subsystems 920–950, and optical signal processor 960 can communicate over media 970. Communication between the various systems may include both electrical and optical signals for implementing the overall functionality of the network element, and thus may vary depending on the particular network element architecture.

Figure 10:
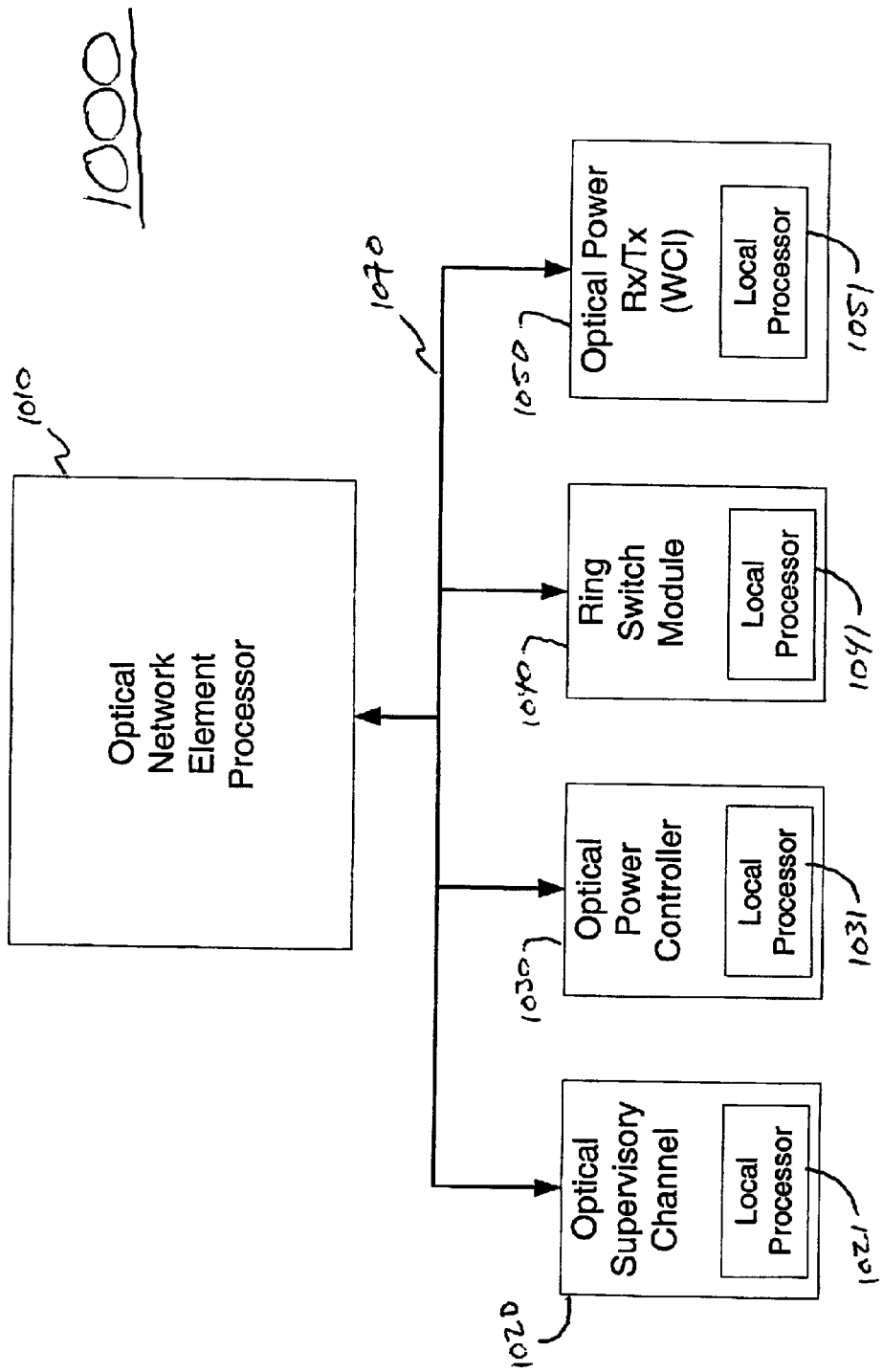
FIG. 10 illustrates a optical network element including an optical network element processor and subsystems according to one embodiment of the present invention.

FIG. 10 illustrates a optical network element 1000 including a optical network element processor 1010 and subsystems according to one embodiment of the present invention. Optical network element 1000 may include an optical supervisory channel subsystem 1020, an optical power control subsystem 1030, a ring switch subsystem 1040, and one or more optical power Rx/Tx generator subsystems 1050 (herein referred to as the wavelength converter interface, "WCI"). Each subsystem 1020–1050 may also include local processors 1021–1051, respectively, for executing NOS software that may include one or more applications on each subsystem.

Embodiments of the present invention are applicable to troubleshooting a variety of network faults. For example, in one particularly advantageous embodiment, the present invention includes a system and method for troubleshooting faults associated with a power management application in an optical network. An exemplary power management system is described in commonly owned U.S. Pat. No. 6,304,347 entitled "OPTICAL POWER MANAGEMENT IN AN OPTICAL NETWORK," and listing Todd Beine, Paul Mitalas, Brian Pheiffer, Denis Zaccarin, Michael E. Durling, and Hon Wah Chin as inventors, the disclosure of which is hereby incorporated herein by reference in its entirety.

Figure 11:
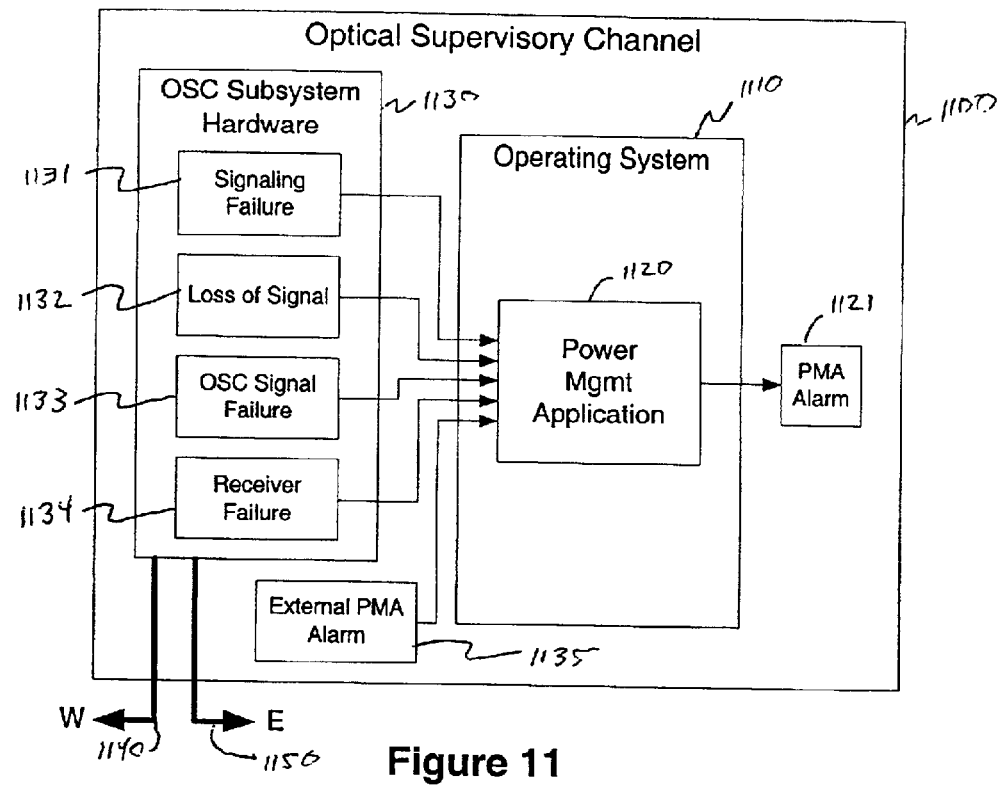
FIG. 11 illustrates application alarm generation for a power management application included as part of the network operating system on the optical supervisory channel subsystem according to one embodiment of the present invention.

FIG. 11 illustrates application alarm generation for a power management application included as part of the NOS on the optical supervisory channel ("OSC") subsystem 1100 according to one embodiment of the present invention. OSC subsystem enables applications on adjacent network element nodes to communicate with each other over the optical fiber spans. Thus, OSC subsystem 1100 includes OSC subsystem hardware 1130 for signaling between network elements on an OSC fiber channel, and NOS software 1110 for controlling the OSC subsystem. For example, the OSC subsystem 1100 may include hardware and software for generating a SONET OC-3c signal operated at 1310 nm that provides a point-to-point communication link between adjacent optical network elements. Each network element can thereby pass control and configuration information to other network elements in the optical network.

The NOS software 1110 includes a power management application 1120 for calculating optical power levels in the optical network. For example, the power management application 1120 may calculate optical power levels that ensure the proper operation of dense wavelength division multiplexed ("DWDM") signals handled by each optical network element in both a "normal mode" and a "protection switched mode," as discussed in more detail below. As shown in FIG. 11, the power management application 1120 is dependent upon proper signaling of the OSC subsystem hardware 1130. If the underlying OSC subsystem 1100 experiences a fault, then the power management application 1120 may be unable to operate. A signaling fault condition in the underlying OSC subsystem hardware 1130 may cause a variety of subsystem alarms such as a signaling failure 1131, loss of signal 1132, OSC signal failure 1133, or receiver failure 1134. A signaling failure 1131 may indicate that the OSC is unable to exchange data over the optical supervisory channel. Additionally, a loss of signal alarm 1132 may indicate that a received optical signal is not as strong as required by the receiver. Furthermore, an OSC signal failure 1133 may indicate that the OSC is unable to detect and extract data from the received optical signal (e.g., when the bit error rate is too high, or when the optical system cannot detect the framing bits). Moreover, a receiver failure 1134 may indicate a failure of the hardware subsystem that receives the optical signal. The specific subsystem alarm generated by the OSC subsystem hardware 1130 will depend on the specific design of the system, the failed or missing components in the OSC subsystem, and the overall state of the network element. These subsystem alarms are transmitted to the power management application 1120. When one of these alarms is received by the power management application 1120, the power management application generates a power management application alarm ("PMA alarm").

In addition to the dependency upon OSC subsystem hardware 1130, power management application 1120 may also be dependent upon PMA alarms from other network elements. For example, if a power management application on one network element fails, it cannot communicate with power management applications on other network elements. This additional dependency is shown in FIG. 11. Thus, a PMA alarm 1135 from another network element may cause power management application 1120 to generate an additional PMA alarm 1121.

In one embodiment, the NOS may associate text corresponding to the subsystem alarm with the application alarm. For example, if the West OSC 1140 has failed, then text reading "Power Signaling Problem West Span" may be associated with the PMA alarm. On the other hand, if the East OSC 1150 has failed, then text reading "Power Signaling Problem East Span" may be associated with the PMA alarm. It is to be understood that the text associated with a particular application alarm depends on the particular active subsystem alarm.

In another embodiment, the present invention includes a system and method for troubleshooting faults associated with the operation of an Optical Shared Protection Ring ("OSPR") subsystem of an optical network, which is also referred to as a Optical Bi-directional Line Switched Ring ("O-BLSR"). One OSPR network that may benefit from the present invention is described in commonly owned U.S. Pat. No. 5,986,783 entitled "METHOD AND APPARATUS FOR OPERATION, PROTECTION, AND RESTORATION OF HETEROGENEOUS OPTICAL COMMUNICATION NETWORKS," and listing Rohit Sharma and Larry R. McAdams as inventors, the disclosure of which is hereby incorporated herein by reference in its entirety. When a fiber or equipment failure occurs due to a cable-cut, malfunction, or maintenance activity, an OSPR network compensates by rerouting the line of affected working traffic from the disabled fibers to reserved channels on good fibers. The traffic is carried around the network to the adjacent network element node on the opposite side of the failed line, where it is switched back to the working channels and continues on to its destination. Protection switching may be accomplished using optical switches in the ring switch module 1040 of FIG. 10 under control of software that detects faults and controls protection switching to reroute traffic. When there are no faults and the network is not rerouting traffic, the network elements are operating in "normal mode." However, when there is a fault, and traffic is rerouted by a ring switch module in one of the network elements, the system is in "protection mode."

Figure 12:
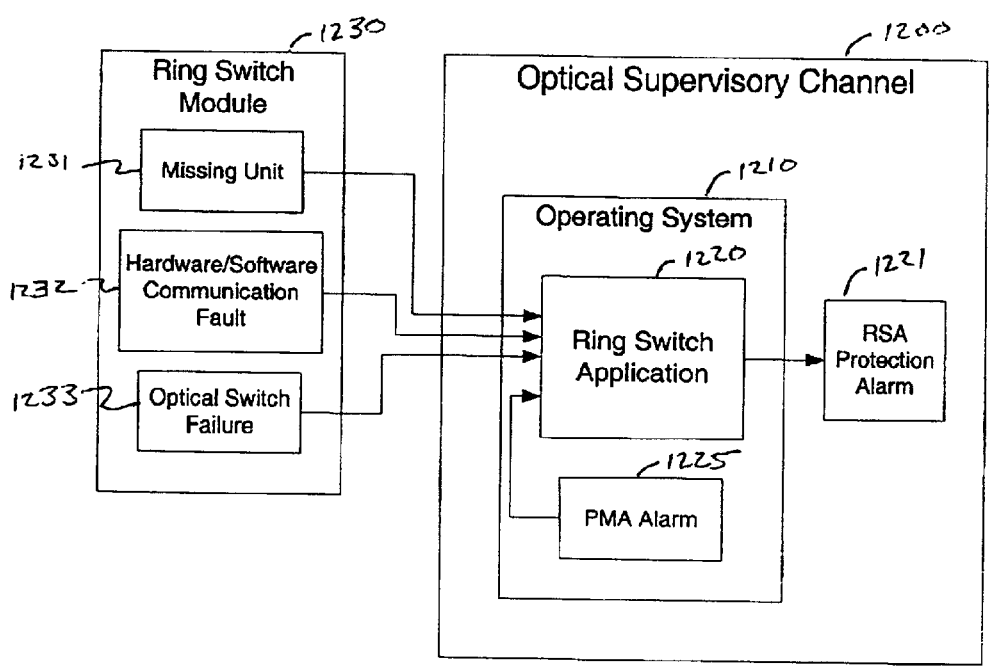
FIG. 12 illustrates application alarm generation for a ring switch application included as part of the network operating system on the optical supervisory channel subsystem according to one embodiment of the present invention.

FIG. 12 illustrates application alarm generation for a ring switch application 1220 included as part of the NOS on the optical supervisory channel ("OSC") subsystem 1200 according to one embodiment of the present invention. The NOS software 1210 includes a ring switch application 1220 that controls switching between "normal" and "protection switched" network operating modes to ensure that traffic is protected in an OSPR network. The ring switch application 1220 responds to faults such as span failures and node failures, and switches the traffic very quickly to satisfy protection switching constraints. If the ring switch application 1220 is unavailable, the network may not be able to restore traffic, and thus an RSA protection alarm 1221 is generated. The ring switch application 1220 may depend on, among other subsytems, both the power management application and the ring switch module subsystem 1230. Thus, if the power management application or ring switch module 1230 are not functioning, the ring switch application 1220 also cannot function.

In one embodiment, when a PMA alarm 1225 is received by the ring switch application 1220, the ring switch application 1220 will raise the RSA protection alarm 1221. Additional text associated with the RSA protection alarm 1221 in this case may include "Power Not Converged," indicating that the power management application is not functioning.

The ring switch application 1220 is also dependent upon working interactions with the ring switch module subsystem 1230. For example, when the ring switch application 1220 receives information indicating that the system must move from "normal mode" to "protection mode," it sends commands to the ring switch module subsystem 1230. If the ring switch module has experienced a fault, and is unable to execute the commands, then the ring switch application is unable to function.

A fault in the ring switch module 1230 may generate a variety of subsystem alarms, depending on the nature of the fault. For example, if the ring switch module 1230 is not properly connected to the system, a missing unit subsystem alarm 1231 will be generated. A corresponding probable cause of "Replaceable Unit Missing" may also be generated. Additionally, if the ring switch module 1230 is connected, but unable to communicate with the rest of the system because of a hardware or software failure, then a hardware/software communication fault subsystem alarm 1232 will be generated. A corresponding probable cause of "Communication Failure" may also be generated. Furthermore, if the ring switch module 1230 is connected and communicating properly, but is unable to execute switching commands due to a hardware failure, then a subsystem alarm, such as an optical switch failure alarm 1233, will be generated. A corresponding probable cause of "Optical Switch Failure" may also be generated.

Figure 13:
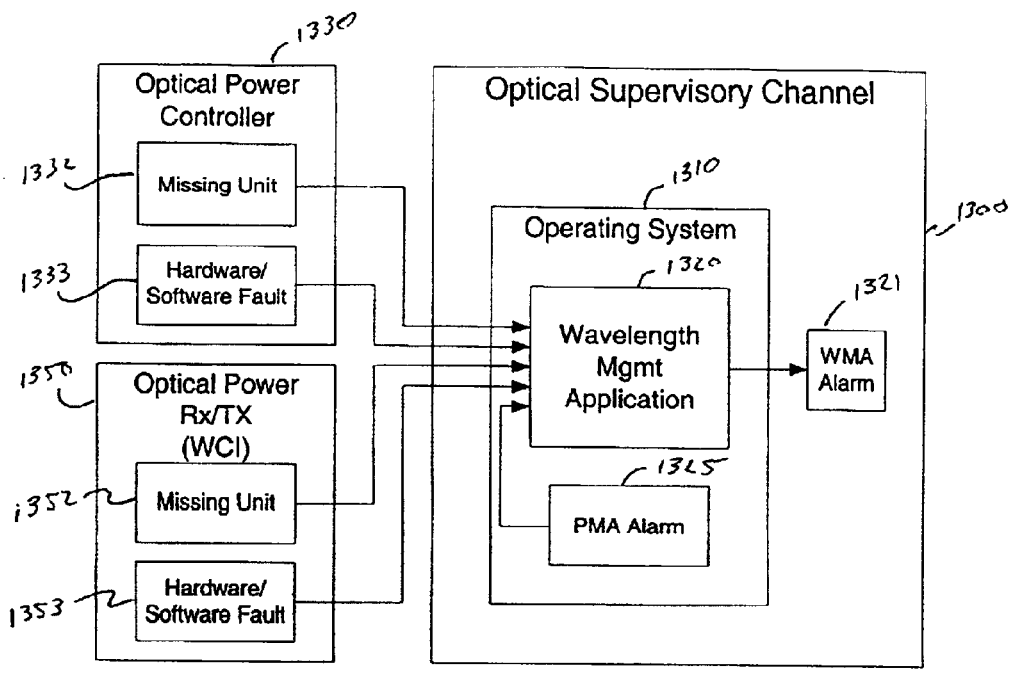
FIG. 13 illustrates application alarm generation for a wavelength management application included as part of the network operating system on the optical supervisory channel subsystem according to one embodiment of the present invention.

Another embodiment of the present invention includes a system and method for troubleshooting faults associated with the operation of a wavelength management subsystem of an optical network. FIG. 13 illustrates application alarm generation for a wavelength management application included as part of the NOS on the optical supervisory channel ("OSC") subsystem 1300 according to one embodiment of the present invention. The NOS software 1310 includes a wavelength management application 1320 that works with the power management application to ensure correct power levels during "normal" and "protection switched" network operating modes. The wavelength management application 1320 also communicates with the optical power controller subsystem 1330 and the WCI 1350 to manage and control the real time power levels in the system. Thus, operability of the wavelength management application 1320 depends on proper functioning of each of these components.

For example, the wavelength management application 1320 cannot function when the power management application is unable to execute. Therefore, when a PMA alarm 1325 is received by the wavelength management application 1320, the wavelength management application 1320 will raise the wavelength management application alarm ("WMA alarm") 1321. Additional text associated with the WMA alarm in this case may include "Power Not Converged," indicating that the underlying root cause is that power management application is not functioning.

Wavelength management application 1320 may also work with the power management application to control resources in the optical power controller subsystem 1330 and WCI subsystem 1350. For example, the optical power controller subsystem 1330 may include variable optical attenuators ("VOAs"), which provide controlled attenuation of optical signals, and optical amplifiers for amplifying the optical signals. The power management application may inform these resources over communication media 1070 of FIG. 10, which may be an ethernet backplane for example, of the expected per-channel optical power under each protection switch scenario (including normal operation). The wavelength management application 1320 may provide information to these resources in real time about the number of channels passing through a VOA or amplifier. The optical power controller subsystem 1330 resources combine such information to control the optical power required for proper operation of the network elements in the network. Thus, if the underlying optical power controller subsystem 1330 resources experience a fault, then the wavelength management application 1320 may be unable to operate.

Failure of the underlying optical power controller subsystem 1330 may cause a variety of subsystem alarms such as a missing unit alarm 1332, corresponding to one of the resources not being properly inserted into the system, or a hardware/software fault 1333. These subsystem alarms are transmitted to the wavelength management application 1320. When one of these alarms is received by the wavelength management application 1320, the wavelength management application 1320 generates a wavelength management application alarm ("WMA alarm") 1321. Additional text associated with the WMA alarm in this case may include "Power Control Not Ready," indicating that the optical power controller 1330 is causing the WMA alarm. Moreover, the subsystem alarm may trigger the NOS software to transmit the text corresponding to the probable cause. In the case of a missing unit alarm 1332, the NOS software may generate a probable cause "Replaceable Unit Missing." In the case of a hardware/software fault alarm 1333, the NOS software may generate a probable cause "Communication Failure."

Similarly, WCI subsystem 1350 may include variable optical attenuators ("VOAs"), laser transmitters, and other resources for generating the optical signals. The wavelength management application 1320 may control the state (e.g., on/off). Thus, if the underlying WCI subsystem 1350 resources experience a fault, and are unable to receive these control signals, then the wavelength management application 1320 may be unable to function. Failure of the underlying WCI subsystem 1350 may cause a variety of subsystem alarms such as a missing unit alarm 1352, corresponding to one of the resources not being properly inserted into the system, or a hardware/software fault 1353. These subsystem alarms are transmitted to the wavelength management application 1320. When one of these alarms is received by the wavelength management application 1320, the wavelength management application 1320 generates a WMA alarm 1321. Additional text associated with the WMA alarm in this case may include "WCI Control Not Ready," indicating that the WCI subsystem 1350 is causing the WMA alarm. Moreover, the subsystem alarm may trigger the NOS software to transmit the text corresponding to the probable cause. In the case of a missing unit alarm 1352, the NOS software may generate a probable cause "Replaceable Unit Missing." In the case of a hardware/software fault alarm 1353, the NOS software may generate a probable cause "Communication Failure."

In yet another embodiment, the present invention includes a system and method for troubleshooting faults associated with the operation of an unidirectional path switched ring ("UPSR") subsystem of an optical network. Similar to O-BLSR networks, when a fiber or equipment failure occurs in a UPSR network, the network compensates by rerouting the line of affected working traffic from the disabled fibers to reserved channels on good fibers. However, rather than carrying the traffic around the network to the adjacent network element node on the opposite side of the failed line, traffic from the tributary source is split onto two paths (i.e., primary and secondary) and sent in opposite directions around the ring to the destination. When the primary path experiences a fault, the destination network element switches from the primary path to the secondary path. Accordingly, because the source node is constantly sending duplicate traffic around both sides of the ring, there is no need for the source and destination network elements to coordinate switching. Therefore, the protection switching decision occurs only at the destination network element.

Figure 14:
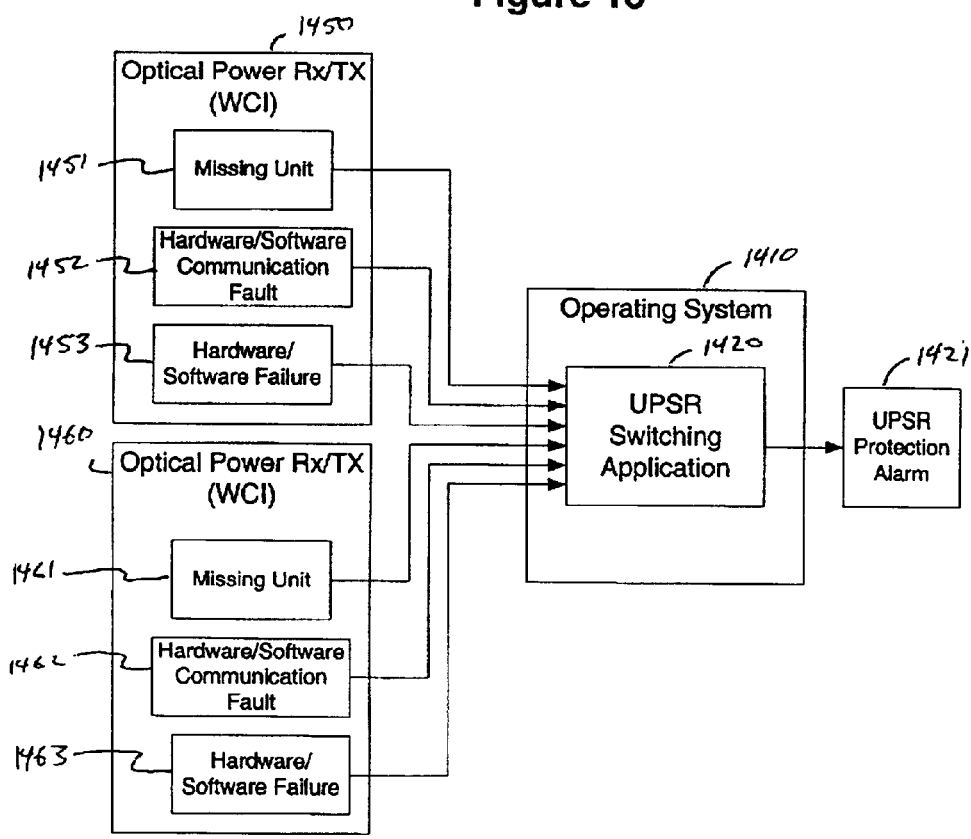
FIG. 14 illustrates application alarm generation for a UPSR switching application included as part of the network operating system according to one embodiment of the present invention.

FIG. 14 illustrates application alarm generation for a UPSR switching application 1420 included as part of the NOS according to one embodiment of the present invention. The NOS software 1410 includes a UPSR switching application 1420 that controls switching between "primary" and "secondary" paths in a network by interfacing with two WCIs connected to one path, respectively. The UPSR switching application 1420 responds to faults such as span failures and node failures, and switches very quickly to satisfy network timing constraints. If the UPSR switching application 1420 is unavailable, the network may not be able to restore traffic, and thus an UPSR protection alarm 1421 is generated. The UPSR switching application 1420 depends with both WCIs 1450 and 1460 for proper operation. Thus, if either of the WCIs 1450 and 1460 are not functioning, the UPSR switching application 1420 also cannot function.

A fault in either of the WCIs 1450 and 1460 may generate a variety of subsystem alarms, depending on the nature of the fault. For example, if one of the WCIs is not properly connected to the system, missing unit subsystem alarms 1451 or 1461 may be generated. A corresponding probable cause of "Replaceable Unit Missing" may also be generated. Additionally, if the WCIs are connected, but either is unable to communicate with the rest of the system because of a hardware or software failure, then hardware/software communication fault subsystem alarms 1452 or 1462 may be generated. A corresponding probable cause of "Communication Failure" may also be generated. Furthermore, if the WCIs are connected and communicating properly, but either are unable to execute due to a hardware or software failure, then a subsystem alarm, such as an hardware/software failure 1453 or 1463, will be generated. Hardware failures may include laser transmitter failures, optical receiver failures, or diagnostic failures with corresponding probable cause of "Transmitter Failure," "Receiver Failure," or "Diagnostics Failure," respectively. Text may also be associated with the UPSR Protection Alarm 1421 to indicate one of these root causes.

Figure 15:
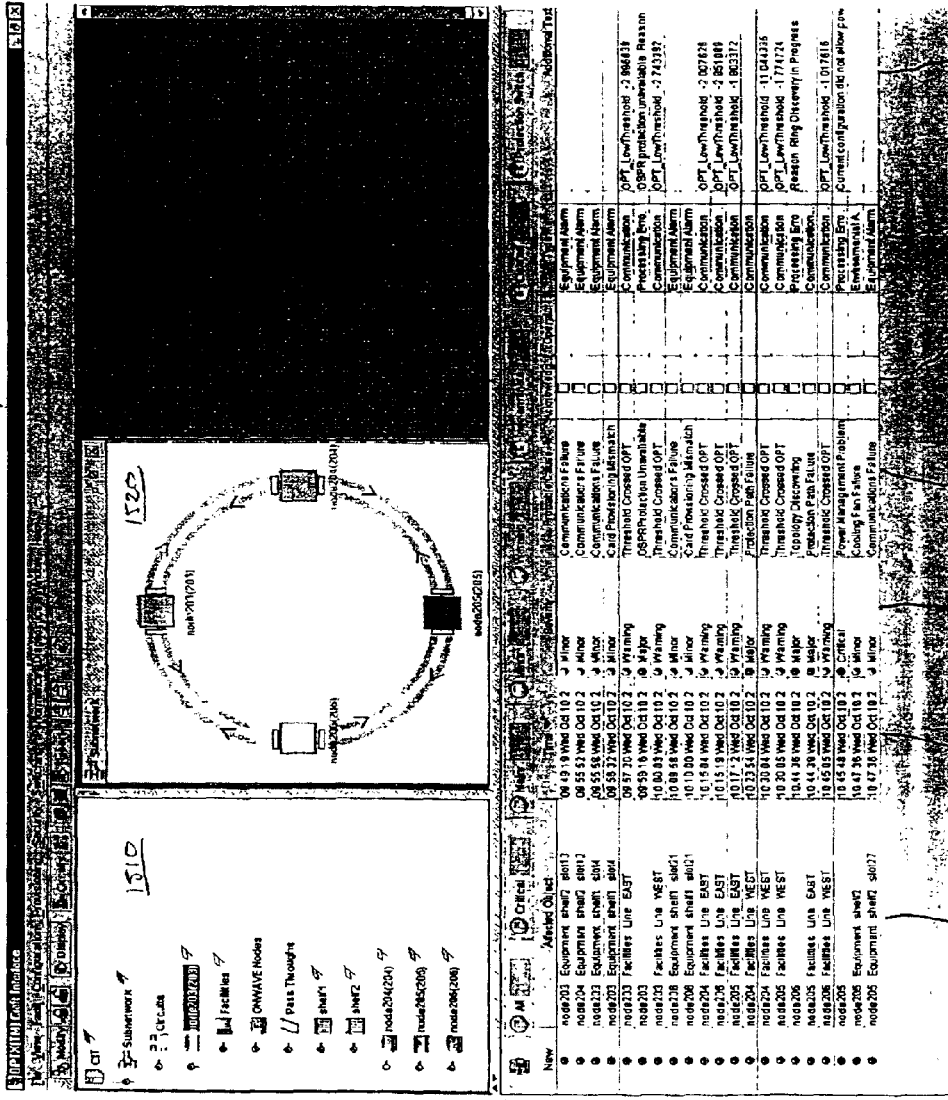
FIG. 15 illustrates a user interface that may be used for displaying alarm information to a user according to one embodiment of the present invention.

FIG. 15 illustrates a user interface 1500 that may be incorporated on a management station for displaying the application alarms, associated text, subsystem alarms and probable causes according to one embodiment of the present invention. The management station running the user interface 1500 signals the distributed network operating system to transmit the alarm information from each network element, across the network, to the management station. The management station then may display the alarm information in user interface 1500. User interface 1500 includes a network menu portion 1510 for allowing users to select different parts of the network. In response to selection, the network menu 1510 will display additional information about that portion of the network. User interface also includes a network configuration window 1520 for displaying the configuration of the network elements. User interface 1500 shows a ring network with four network elements, for example.

User interface further includes a network alarm display 1530. Network alarm display 1530 displays all alarms in the network in columns and rows. Network alarm display 1530 displays application alarms and subsystem alarms in the probable cause column 1534. The associated text is displayed in additional text column 1537. Further information may also be provided about the alarm type in column 1536. Type information may also be associated with each alarm by the NOS in each network element. Network alarm display 1530 also includes a column that identifies the affected object 1531 by network element (e.g., node number) and subsystem (e.g., shelf location or span identification), a column indicating the time of the fault 1532, a column identifying the severity of the fault 1533, and a column for the user to indicate acknowledgment of each fault 1535. Accordingly, the management station includes software for signaling the distributed network operating system to transmit all this information from each network element, across the network, and to the management station for display to a user. A user can thereby connect to any network element and quickly and accurately determine the faults in the network, and take effective correction action to address the faults.

Thus, the present invention provides a system and method for troubleshooting a network. While the system and method have been described with reference to particular embodiments, it will be apparent to those of ordinary skill in the art that modifications to the above embodiments can be made without departing from the scope of the invention as defined by the claims. For example, one modification would be to integrate the management station into one or more of the network elements with the user interface being included as part of the distributed network operating system. For another example, in the case of applying the present invention to an optical network, alternative optical network element architectures could be used. Other architecture specific modification could also be made. Accordingly, the embodiments disclosed are intended to be illustrative, but not limiting, of the scope of the invention, which is set forth in the following claims.

What is claimed is:

1. A communication network comprising:
   a plurality of network elements coupled together to communicate information across the network;
   a management station coupled to a first network element in the plurality of network elements;
   a plurality of network element subsystems in each network element, at least one of the plurality of network element subsystems generating a subsystem alarm in response to a subsystem fault condition; and
   a distributed network operating system including at least one subsystem application on each network element for generating an application alarm in response to receiving the subsystem alarm,
   wherein the management station signals the distributed network operating system to transmit application alarms and subsystem alarms from each network element, across the network to the first network element, and to the management station for display to a user.

2. The communication network of claim 1 wherein the distributed network operating system further includes executable code for associating text, corresponding to the subsystem fault condition, with the application alarm, and wherein the associated text is transmitted to the management station with the application alarms and subsystem alarms.

3. The communication network of claim 1 wherein a first subsystem application on each network element includes application code for generating a first application alarm in response to receiving a second application alarm from a second subsystem application.

4. The communication network of claim 1 wherein the subsystem alarm is generated on a first network element subsystem, and the at least one subsystem application is executable on the first network element subsystem.

5. The communication network of claim 1 wherein the subsystem alarm is generated on a first network element subsystem, and the at least one subsystem application is executable on a second network element subsystem.

6. The communication network of claim 1 wherein the network is an optical network and the plurality of network elements are coupled together using optical fibers.

7. The communication network of claim 6 wherein the application alarms, subsystem alarms, and associated text are transmitted across the network over a network optical supervisory channel in response to the management station signals.

8. The communication network of claim 6 wherein the distributed network operating system includes a power management application on each network element for calculating optical power levels in the optical network, and wherein the power management application generates a power management application alarm in response to the subsystem alarm.

9. The communication network of claim 8 wherein the subsystem alarm is generated on a first network element subsystem, and the power management application is executable on the first network element subsystem.

10. The communication network of claim 9 wherein the first network element subsystem is for signaling between network elements, and the subsystem alarm is in response to a signaling fault condition.

11. The communication network of claim 8 wherein the distributed network operating system includes a wavelength management application on each network element for managing optical power levels in the optical network, and wherein the wavelength management application generates a wavelength management application alarm in response to the power management application alarm.

12. The communication network of claim 6 wherein the distributed network operating system includes a wavelength management application on each network element for managing optical power levels in the optical network, wherein the wavelength management application is executable on a first subsystem for signaling between network elements, and wherein the wavelength management application generates a wavelength management application alarm in response to a hardware fault condition in the first subsystem.

13. The communication network of claim 6 wherein the network is a ring network and the distributed network operating system includes a ring switching application on each network element for controlling a ring switching subsystem for re-routing optical signals in response to span failures, wherein the ring switching application generates a ring switching application alarm in response to a hardware fault condition in the ring switching subsystem.

14. The communication network of claim 6 wherein the network is a UPSR network and the distributed network operating system includes a UPSR application on each network element for controlling path switching in response to faults in a primary traffic path, wherein the UPSR application generates a UPSR application alarm in response to a hardware fault condition in an optical power generator subsystem.

15. A method of troubleshooting a plurality of network elements in a network under control of a distributed network operating system, each network element including a plurality of network element subsystems, the method comprising:
   generating a subsystem alarm for at least one of the plurality of network element subsystems in response to a corresponding subsystem fault;

generating an application alarm in a subsystem application in response to the subsystem alarm;

associating text with the application alarm, the associated text describing the subsystem fault; and transmitting the subsystem alarm, the application alarm, and the associated text across the network to a management station coupled to one of the network elements for display to a user.

16. The method of claim 15 wherein the subsystem alarm is generated on a first network element subsystem, and the application alarm is generated in a subsystem application that is executable on a second network element subsystem in response to a fault on the first network element subsystem.

17. The method of claim 15 wherein the subsystem alarm is generated on a first network element subsystem, and the application alarm is generated in a subsystem application that is executable on the first network element subsystem in response to a fault on the first network element subsystem.

18. The method of claim 15 wherein a first subsystem application on each network element includes application code for generating a first application alarm in response to receiving a second application alarm from a second subsystem application.

19. The method of claim 15 wherein the network is an optical network and the plurality of network elements are coupled together using optical fibers.

20. A method of troubleshooting an optical network comprising:

under control of a distributed network operating system, generating one or more subsystem alarms corresponding to subsystem fault conditions on at least one of a plurality of network elements in the optical network;

generating at least one application alarm when the one or more subsystem alarms satisfy a corresponding at least one application alarm condition;

associating at least one text element with the at least one application alarm;

transmitting the one or more subsystem alarms, the at least one application alarm, and the at least one text element across said optical network to a first network element in the plurality of network elements; and transmitting the one or more subsystem alarms, the at least one application alarm, and the at least one text element to a management station coupled to the first network element, and under control of a management station, displaying the one or more subsystem alarms, the at least one application alarm, and the at least one text element to a user.

21. The method of claim 20 wherein the one or more subsystem alarms, the at least one application alarm, and the at least one text element are transmitted across the network over a network optical supervisory channel in response to the management station signals.

22. The method of claim 20 wherein the distributed network operating system includes a power management application on each network element for calculating optical power levels in the optical network, and wherein the power management application generates a power management application alarm in response to the subsystem alarm.

23. The method of claim 22 wherein the first subsystem alarm is generated on a first network element subsystem, and the power management application is executable on the first network element subsystem.

24. The method of claim 23 wherein the first network element subsystem is for signaling between network elements, and the first subsystem alarm is in response to a signaling fault condition.

25. The method of claim 20 wherein the distributed network operating system includes a wavelength management application on each network element for managing optical power levels in the optical network, wherein the wavelength management application is executable on a first subsystem for signaling between network elements, and wherein the wavelength management application generates a wavelength management application alarm in response to a hardware fault condition in the first subsystem.

26. The method of claim 20 wherein the network is a ring network and the distributed network operating system includes a ring switching application on each network element for controlling a ring switching subsystem for re-routing optical signals in response to span failures, wherein the ring switching application generates a ring switching application alarm in response to a hardware fault condition in the ring switching subsystem.

27. The method of claim 20 wherein the network is a UPSR network and the distributed network operating system includes a UPSR application on each network element for controlling path switching in response to faults in a primary traffic path, wherein the UPSR application generates a UPSR application alarm in response to a hardware fault condition in an optical power generator subsystem.

28. A program storage device readable by a machine, tangibly embodying a program of instructions executable by the machine to perform method steps for troubleshooting a network, said method steps comprising:

generating a subsystem alarm for at least one of the plurality of network element subsystems in response to a corresponding subsystem fault;

generating an application alarm in a subsystem application in response to the subsystem alarm;

associating text with the application alarm, the associated text describing the subsystem fault; and transmitting the subsystem alarm, the application alarm, and the associated text across the network to a management station coupled to one of the network elements for display to a user.

* * * * *